United States Patent Office 3,759,909
Patented Sept. 18, 1973

3,759,909
FUMARAMIC ACID DERIVATIVES
Howard A. Hageman, Southbury, Conn., assignor to
Uniroyal, Inc., New York, N.Y.
No Drawing. Continuation of application Ser. No.
523,545, Jan. 28, 1966. This application May 16,
1969, Ser. No. 825,441
Int. Cl. C07d 87/42
U.S. Cl. 260—247.2 A          21 Claims

ABSTRACT OF THE DISCLOSURE

N-[disubstituted amino] fumaramic acids and their preparation. Useful as plant growth regulants.

CROSS-REFERENCE TO RELATED APPLICATION

This application is a continuation of my application Ser. No. 523,545, filed Jan. 28, 1966, now abandoned.

SUMMARY OF THE INVENTION

The instant invention relates to new compositions of matter and their method of preparation. Morse specifically, the invention describes N-[disubstituted amino] fumaramic acids and derivatives thereof. These compounds are useful as plant growth regulants and fungicides.

DESCRIPTION OF THE PREFERRED EMBODIMENTS

The N-[disubstituted amino] radicals may be dialkylamino, 1-pyrrolidyl, 1-piperidyl, or 4-morpholinyl; and one of the carbons of the intermediate double-bonded carbons of the fumaramic acid may contain a lower alkyl group. Additionally, salts and esters of the N-[disubstituted amino] fumaramic acids as well as salts of these esters with strong mineral acids are within the scope of the invention.

The N-[disubstituted amino] fumaramic acids are prepared by the isomerization of a strong acid salt of the corresponding N-[disubstituted amino] maleamic acid. These latter compounds may be prepared as described in copending U.S. application Ser. No. 258,923 filed Feb. 15, 1963, now U.S. Pat. No. 3,240,799, patented Mar. 15, 1966.

Included within the scope of the invention, in addition to the free acids, are their equivalent salts, such as the alkali salts, i.e., alkali metal, alkaline earth metal, ammonium or amine (substituted ammonium) salts, e.g., sodium, potassium, calcium, ammonium, methyl ammonium, dimethyl ammonium, trimethyl ammonium, ethyl ammonium, ethanol ammonium, diethanol ammonium, or triethanol ammonium salts. The salts may readily be formed directly from the acid and a selected base such as an alkali metal hydroxide or carbonate, or ammonia, or an amine.

Additionally, by protonation of the disubstituted amino groups, salts of strong mineral acids may be formed. Such salts include for example the hydrohalide (e.g., hydrochloride) phosphate, and sulfate.

The esters of the N-disubstituted amino] fumaramic acids, such as the alkyl esters having 1 to 12 carbon atoms in the esterifying radical, and the alkenyl esters having 3 to 4 carbon atoms in the esterifying radical may be used as plant growth regulants, e.g., the methyl, ethyl, propyl, butyl, octyl, dodecyl, allyl and methallyl esters. The esters may be formed by esterifying the selected N-[disubstituted amino] fumaramic acid with the selected alcohol, or directly from the maleamic acid or maleimide component by performing the isomerization in an alcoholic medium. Also the salts of these esters with strong mineral acids have been prepared.

The N-[disubstituted amino] fumaramic acids of the present invention may be represented by the general formula:

$$R_3-\overset{O}{\underset{\|}{C}}-\overset{H}{\underset{\|}{C}}-\overset{}{\underset{}{N}}-N\diagdown\overset{R_1}{\diagdown R_2}$$
$$HO-\overset{}{\underset{\|}{C}}-\overset{}{\underset{\|}{C}}-R_4$$
$$O$$

wherein $R_1$ and $R_2$ each stand for an alkyl group having 1 to 12 carbon atoms or $R_1$ and $R_2$ compositely stand for a $-(CH_2)_4-$, $-(CH_2)_5-$ or $(-CH_2CH_2)_2O$ group; and $R_3$ and $R_4$ each stand for hydrogen, or one of $R_3$ and $R_4$ stands for hydrogen and the other stands for a lower alkyl group having 1 to 8 carbon atoms, e.g. methyl, butyl, octyl.

Examples of chemicals of the present invention are:

N-[dimethylamino]fumaramic acid
N-[dimethylamino]fumaramic acid hydrochloride
N-[dimethylamino]fumaramic acid phosphate
N-[dioctylamino]fumaramic acid
N-[didodecylamino]fumaramic acid
N-(4-morpholinyl)fumaramic acid
N-(1-piperidyl)fumaramic acid
N-(1-pyrrolidyl)fumaramic acid
Sodium N-(dimethylamino)fumaramate
Calcium N-[dimethylamino]fumaramate
Isopropyl N-[dimethylamino] fumaramate
Ethyl N-[dimethylamino]fumaramate hydrochloride
N-[dimethylamino]mesaconamic acid
Ethyl N-[dimethylamino]fumaramate
Diethanolammonium salt of N-[dimethylamino] fumaramic acid
Allyl N-[dimethylamino]fumaramate
Methallyl N-[dimethylamino]fumaramate hydrochloride It is well known that maleic acid and many of its simple derivatives can be rearranged ot the fumaric form by heating with catalytic amounts of halogen, halogen acids, Lewis acids ($AlCl_3$, $ZnCl_2$, $FeCl_3$, etc.), sulfur and sulfur halides, as well as by catalytic surfaces in noble metal catalysts. By using these known methods in several attempts to effect the desired cis- to trans-rearrangement in the case of N-dimethylaminomaleamic acid, no rearrangement was achieved. The use of 1% by weight of iodine in refluxing acetonitrile resulted only in the recovery of unchanged starting material. Replacement of the iodine by sulfur in a similar procedure resulted in extensive decomposition and resinification. No rearrangement was achieved when N-dimethylaminomaleamic acid was refluxed in acetonitrile in the presence of 6% by weight of 5% palladium on carbon catalyst. The use of concentrated aqueous hydrochloric acid resulted in extensive hydrolysis and the formation of fumaric acid.

In accordance with the invention, it has been discovered that the N-[disubstituted amino] fumaramic compounds of the instant invention may be prepared by the rearrangement of the N-[disubstituted amino] maleamic compounds, wherein the latter disubstituted amino group has been protonated (has a $H^+$ ion). The reaction must be carried out in an inert reaction medium. The protonated maleamic form may then be rearranged with several known maleic acid isomerization catalyst.

The protonation of the disubstituted amino group of the maleamic form may be readily achieved by forming an acid salt with strong acids which do not cause adverse side effects such as oxidation, dehydration, or hydrolysis. The hydrogen halide salts are the most preferable reactants, particularly the hydrogen chloride and the hydrogen bromide.

Inert reaction mediums include any liquid which will not hydrolyze, oxidize, or dehydrate the reactants. Examples of these are the lower carboxylic acids and the halosubstituted carboxylic acids, such as glacial acetic acid, propionic acid and acetonitrile. Various other solvents can be used depending on the physical properties of the particular substituted amino maleamic derivative to be rearranged. The best results, however, are obtained with glacial acetic acid and acetonitrile.

If the desired products are the esters of the N-[disubsituted amino] fumaramic acid, the appropriate alcohol can be used as the reaction medium. It is thus possible to effect both esterification of the N-[disubstituted amino] maleamic acid (or its imide) and the rearrangement to the fumaramic ester all in one step. Though, in this case the solvent is not, strictly speaking, inert, it does permit the formation of the basic fumaramic structure.

The isomerization of the maleamic form to the fumaramic form may be carried out in the presence of non-oxidizing maleic acid isomerization catalysts. Catalysts which may be used include hydrohalic acids, iodine, and aluminum chloride.

The catalytic isomerization is carried out at a temperature of from 20 to 120° C. preferably from 75° to 85° C., in the presence of 0.02 to 20% of catalyst, preferably 0.1 to 10% by weight.

The following examples serve to more specifically illustrate the instant invention:

EXAMPLE I

Preparation of N-[dimethylamino] fumaramic acid

When a partial solution of 15.8 g. (.10 mole) of N-[dimethylamino] maleamic acid (M.P. 124–125°) in 40 g. of glacial acetic acid was treated with anhydrous HCl until 4.0 g. (.11 mole) had been absorbed, there resulted complete solution of all the solid in the warm solution. The molar excess of the HCl served as the catalyst. After heating to 75–80° C. on a steam plate for ½ hr. of a solid crystalline mass had formed. This mixture was then allowed to cool to room temperature over 1 hour and then treated with 30 g. of acetonitrile. The cake was broken and the resulting slurry cooled in an ice bath for ½ hr. Filtration and washing with 50 g. of cold acetonitrile gave 17 g. (90% yield) of N-[dimethylamino] fumaramic acid hydrochloride as colorless crystals of M.P. 213–215° C. (d.).

Neutral equivalent calc'd: 97. Found: 97.

This product readily dissolves in water to give a strongly acidic (pH 1–2) solution. When a solution of 5 g. of this product in 10 ml. of water was treated with concentrated aqueous $NH_3$ until the pH of the solution had been raised to 4–5, there resulted the precipitation of N-[dimethylamino] fumaramic acid as a white solid. Filtration and washing with cold water gave 4.0. g. of colorless crystals of M.P. 214–216° C. (d.).

EXAMPLE II

To a partial solution of 15.8 g. (.10 mole) of N-[dimethylamino] maleamic and (M.P. 124–125°) in 50 g. of glacial acetic acid was added anhydrous HCl until 3.6 g. (.10 mole) had been absorbed. After adding .05 g. of iodine crystals, the resulting yellow solution was heated on a steam plate to 70–80° C. for 2½ hrs. and then allowed to cool to room temperature over 2 hrs. Filtration, followed by washing with ether, gave 14 g. of N-[dimethylamino] fumaramic acid hydrochloride as colorless crystals of M.P. 214–216° C. (d.).

EXAMPLE III

To a suspension of 15.8 g. (.10 mole) of N-[dimethylamino] maleamic (M.P. 124–125° C.) in 35 g. of glacial acetic acid was added 3.6 g. (.10 mole) of anhydrous HCl. To the resulting clear solution was added 0.10 g. of anhydrous $AlCl_3$. Within 5 minutes after placing on the steam plate the contents of the flask set to a solid mass of white crystals. After allowing to stand at room temperature for 1 hour the cake was broken and 30 g. of acetonitrile was added. Filtration, followed by washing with acetonitrile, gave 16 g. of N-[dimethylamino] fumaramic acid hydrochloride of M.P. 213–215° C. (d.).

These three examples show that in practicing this new process it is essential to completely neutralize the hydrazine moiety as the salt of a strong mineral acid and that the cis to trans rearrangement can subsequently be catalyzed by small amounts of non-oxidizing maleic acid isomerization catalysts such as iodine, $AlCl_3$ and hydrogen halide.

Esters of N-[dimethylamino]fumaramic acid are readily prepared by refluxing the hydrochloride salt with the appropriate alcohol to yield the ester hydrochloride from which the free ester can be liberated by the addition of base to an aqueous solution of the ester hydrochloride. In this manner the following esters were prepared:

Methyl-N-[dimethylamino]fumaramate hydrochloride, M.P. 132–134° C.

Methyl - N - [dimethylamino]fumaramate, M.P. 141–143° C.

Ethyl - N-[dimethylamino]fumaramate hydrochloride, M.P. 119–122° C.

Ethyl - N - [dimethylamino]fumaramate, M.P. 134–136° C.

EXAMPLE IV

Preparation of N-(1-piperidyl)fumaramic acid

To a mixture of 12 g. ofN-(1-piperidyl)maleamic acid hydrochloride [M.P. 153–156° C. (d.)] and 40 g. of glacial acetic acid was added 0.10 g. of $AlCl_3$. When heated to 70–75° C. for 1 hour, the solid initially present soon dissolved completely and then a new solid gradually precipitated. After adding 20 g. of acetonitrile and cooling in an ice bath for ½ hour, filtration gave 7.0 g. of N-(1-piperidyl)fumaramic acid hydrochloride as colorless crystals of M.P. 216–218° C. (d.).

To a solution of 5 g. of this product in 15 ml. of water there was gradually added sufficient aqueous ammonia to raise the pH to 4–5. The solid which precipitated was collected by filtration and washed with cold water. There was obtained 4.0 g. of N-(1-piperidyl) fumaramic acid as colorless crystals of M.P. 215–217° C. (d.).

EXAMPLE V

Preparation of N-[dimethylamino]mesaconamic acid hydrochloride

To a partial solution of 5.0 g. (.03 mole) of N-[dimethylamino]citraconamic acid (M.P. 123–125°) in 15 g. of glacial acetic acid was added 2.0 g. (.005 mole) of anhydrous HCl. As the introduction of the HCl was completed, all of the solid dissolved in the warm solution and then suddenly a new precipitate formed rapidly. After allowing to stand for 20 minutes, 15 g. of acetonitrile was added and the mixture cooled in an ice bath for ½ hour. Filtration yielded 3.0 of N-[dimethylamino]mesaconamic acid hydrochloride as colorless crystals of M.P. 140–142° C.

EXAMPLE VI

Preparation of N-(4-morpholinyl)fumaramic acid

When a mixture of 10 g. (.05 mole) of N-(4-morpholinyl)maleamic acid (M.P. 172–174° C.) and 80 g. of glacial acetic acid was heated to 70° C., complete solution of the solid resulted. Into this hot solution was passed anhydrous HCl until 3.6 g. (.10 mole) had been absorbed. This resulted in a rise in temperature of the mixture to 80° C. and the precipitation of a small amount of the hydrochloride salt. Heating to 85–88° C. caused complete solution of all solids. At this point 0.2 g. of $AlCl_3$ was added. This caused the rapid formation of a precipitate. After continuing heating to 80–85° C. for 15 minutes, this mixture was allowed to cool to room temperature over ½ hour. Subsequent cooling in an ice bath, followed by filtration and washing with ether, gave 10 g. of N-(4-morpholinyl)fumaramic acid hydrochloride as colorless crystals of M.P. 204–206° C. (d.). This product, upon treatment with water, readily hydrolyze to HCl and N-(4-morpholinyl)fumaramic acid which precipitates as colorless crystals of M.P. 221–224° C. (d.).

EXAMPLE VII

This example demonstrates that N-(dimethylamino)fumaramic acid hydrochloride can be prepared in one operation from maleic anhydride, 1,1-dimethylhydrazine and anhydrous HCl without isolating the intermediate N-(dimethylamino)maleamic acid.

To a solution of 49 g. (.50 mole) of maleic anhydride in 100 g. of glacial acetic acid was gradually added a mixture of 30 g. (.50 mole) of 1,1-dimethylhydrazine and 75 g. of glacial acetic acid. This latter mixture was prepared by the gradual addition, with cooling, of the 1,1-dimethylhydrazine to the acetic acid.

While adding this mixture to the solution of maleic anhydride in acetic acid, cooling was employed so that the temperature of the reaction mixture did not exceed 30° C. The resulting clear yellow solution was allowed to stand at room temperature for 15 minutes.

When 19 g. (.52 mole) of anhydride HCl was passed into this solution, the temperature rapidly rose to 70–75° C. After standing for ½ hour the original pale yellow solution had set to a solid mass of white crystals. After standing for an additional 1 hour, 100 ml. of acetonitrile was added and the resulting slurry filtered. The filter cake was washed with 50 ml. of acetonitrile then with two 100 ml. portions of ethers. There was obtained 70 g. of N-(dimethylamino)fumaramic acid hydrochloride as colorless crystals of M.P. 212–215° C. (d.).

EXAMPLE VIII

The rearrangement may be carried out in acetonitrile in a manner similar to that using acetic acid. To a suspension of 7.9 g. (0.05 mole) of N-dimethylaminomaleamic acid in 20 ml. of acetonitrile was added 2.0 g. (0.055 mole) of hydrogen chloride. The mixture became warm and the solid dissolved. Warming the solution on a steam bath resulted in some precipitate formation within 5 minutes. Precipitate formation was complete in 15 minutes. After adding 20 ml. of ether, filtration of the slurry yielded 9.5 g. (98% yield) of N-dimethylaminofumaramic acid hydrochloride identified by its infrared spectrum.

EXAMPLE IX

To a suspension of 31.0 g. (0.2 mole) of N-dimethylaminomaleamic acid in 100 ml. of methanol was added 8.0 g. (0.22 mole) of hydrogen chloride. Solution of the solid occurred upon heating to reflux. After 15 hours of refluxing the methanol was removed leaving a yellow, oily residue. This was dissolved in water and the solution then made slightly basic by the addition of dilute ammonia. The resultant precipitate was filtered and identified as methyl-N-dimethylaminofumaramate M.P. 141–3° C. and by its infrared spectrum.

EXAMPLE X

The isomerization and esterification are carried out in one step in this example as follows:

To a solution of 11.5 g. (0.082 mole) of N-dimethylaminomaleimide in 50 ml. of ethanol was added 3.2 g. (0.088 mole) of hydrogen chloride. The solution was refluxed for 1½ hours and then concentrated by removal of the methanol under reduced pressure. The addition of ether caused the precipitation of an oil which crystallized. There was obtained 15 g. (83% yield) of ethyl-N-dimethylaminofumaramate hydrochloride identified by its infrared spectrum.

EXAMPLE XI

A suspension of 1.6 g. (0.01 mole) of N-dimethylaminomaleamic acid in 25 ml. of acetonitrile was treated with 0.015–0.020 mole of anhydrous hydrogen bromide. Upon initial warming on a steam bath solution occurred. After a few minutes there precipitated a solid of M.P. 187–190° C. Conversion of the salt to the free base yielded N-dimethylaminofumaramic acid M.P. 213–215° C. (d.).

Having thus described my invention, what I claim and desire to protect by Letters Patent is:

1. A compound having the formula:

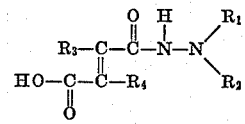

wherein $R_1$ and $R_2$ are alkyl groups having 1 to 12 carbon atoms or compositely are a $-(CH_2)_4-$, $-(CH_2)_5-$, or $-(CH_2CH_2)_2O$ group; $R_3$ and $R_4$ are both hydrogen or one is hydrogen and the other is an alkyl group having 1 to 8 carbon atoms; or the alkyl ester of said compound in which the alkyl group has 1 to 12 carbon atoms; the alkenyl ester of said compound in which the alkenyl group has 3 or 4 carbon atoms; or the alkali metal, alkaline earth metal, ammonium, or amine salt of the carboxyl group of said compound; or the strong mineral acid salt of the disubstituted amino group of said compound.

2. The compound of claim 1 wherein said $R_3$ and $R_4$ are hydrogen.

3. The compound of claim 1 wherein $R_1$ and $R_2$ are methyl or ethyl and $R_3$ and $R_4$ are hydrogen.

4. The compound of claim 1 wherein said compound is the alkyl ester and the alkyl group is methyl or ethyl.

5. The compound of claim 1 wherein the compound is the strong mineral acid salt of the disubstituted amino group.

6. The composition of claim 1: N-[dimethylamino] fumaramic acid.

7. The composition of claim 1: N-[dimethylamino] fumaramic acid hydrochloride.

8. The composition of claim 1: sodium N-[dimethylamino] fumaramate.

9. The composition of claim 1: the methyl or ethyl-N-[dimethylamino] fumaramate hydrochloride.

10. The composition of claim 1: the methyl or ethyl-N-[dimethylamino] fumaramate.

11. The compound of claim 1: N-(4-morpholinyl) fumaramic acid.

12. A method of preparing the strong mineral acid salt of a compound having the formula:

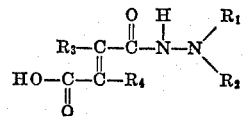

wherein $R_1$ and $R_2$ are alkyl groups having 1 to 12 carbon atoms or compositely are a $-(CH_2)_4-$, $-(CH_2)_5-$, or $-(CH_2CH_2)_2O$ group; $R_3$ and $R_4$ are both hydrogen or one is hydrogen and the other is an alkyl group having 1 to 8 carbon atoms; or the alkyl ester of said compound in which the alkyl group has 1 to 12 carbon atoms; the alkenyl ester of said compound in which the alkenyl group has 3 or 4 carbon atoms; or the alkali metal, alkaline earth metal, ammonium, or amine salt of said compound; which comprises: protonating the disubstituted amino group of the corresponding N-[disubstituted amino] maleamic acid with anhydrous hydrogen halide and isomerizing the protonated N-[disubstituted amino] maleamic acid at a temperature from 20 to 120° C. in the presence of 0.2 to 20% of a maleic acid isomerization catalyst in an inert reaction medium.

13. A method of preparing N-[dimethylamino] fumaramic acid hydrochloride which comprises: reacting maleic anhydride and 1,1-dimethylhydrazine in a glacial acetic acid solution in the presence of a molar excess of anhydrous HCl at a temperature between 20 and 120° C. thereby forming N-[dimethylamino] fumaramic acid hydrochloride.

14. A method of preparing the alkanol ester of a compound having the formula:

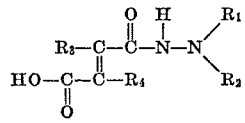

wherein $R_1$ and $R_2$ are alkyl groups having 1 to 12 carbon atoms or compositely are a —$(CH_2)_4$—, —$(CH_2)_5$—, or —$(CH_2CH_2)_2O$ group; $R_3$ and $R_4$ are both hydrogen or one is hydrogen and the other is an alkyl group having 1 to 8 carbon atoms; which comprises: reacting the corresponding N-[disubstituted amino] maleamic acid or N-[disubstituted amino] maleimide with an alkanol having 1 to 12 carbon atoms in the presence of an equimolar quantity of anhydrous hydrogen halide and isomerizing the protonated N-[disubstituted amino] maleamic acid at a temperature from 20 to 120° C. in the presence of 0.2 to 20% of a maleic acid isomerization catalyst in an inert reaction medium.

15. The method of claim 14 wherein said imide is reacted with said alkanol in the presence of a molar excess of a hydrogen halide, said excess hydrogen halide serving as said maleic acid isomerization catalyst.

16. The method of claim 12 wherein the disubstituted amino group is a dimethylamino group.

17. The method of claim 12 wherein said N-disubstituted maleamic acid is protonated by reaction with a hydrohalic acid.

18. The method of claim 17 wherein said hydrohalic acid is hydrochloric acid.

19. The method of claim 12 wherein said inert reaction medium is a lower carboxylic acid or a lower carboxylic acid nitrile.

20. The method of claim 19 wherein the inert reaction medium is glacial acetic acid.

21. The method of claim 15 wherein the alkanol is methanol and the hydrogen halide is hydrogen chloride.

References Cited
UNITED STATES PATENTS

| | | | |
|---|---|---|---|
| 2,809,190 | 10/1957 | Kelly et al. | 260—211 |
| 3,228,972 | 1/1966 | Schwartz | 260—482 |
| 3,240,799 | 3/1966 | Hageman | 260—482 |

FOREIGN PATENTS 1,499,466  9/1967  France.

ALEX MAZEL, Primary Examiner

J. TOVAR, Assistant Examiner

U.S. Cl. X.R.

260—293, 86, 326.3, 482 R, 534 R; 71—76, 106, 113, 118